US012643564B2

(12) United States Patent
Wilson et al.

(10) Patent No.: US 12,643,564 B2
(45) Date of Patent: Jun. 2, 2026

(54) BRAKING SOUND AUGMENTATION

(71) Applicant: GM Global Technology Operations LLC, Detroit, MI (US)

(72) Inventors: Christopher R. Wilson, Farmington Hills, MI (US); Edward Thomas Heil, Howell, MI (US); Sundaresan Balasubramanian, Lake Orion, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 101 days.

(21) Appl. No.: 18/931,419

(22) Filed: Oct. 30, 2024

(65) Prior Publication Data

US 2026/0116413 A1     Apr. 30, 2026

(51) Int. Cl.
*B60W 50/14*          (2020.01)
*B60L 3/10*           (2006.01)
(Continued)

(52) U.S. Cl.
CPC ............. *B60W 50/14* (2013.01); *B60L 3/106* (2013.01); *B60L 3/108* (2013.01); *B60W 30/02* (2013.01);
(Continued)

(58) Field of Classification Search
CPC ... B60K 28/00–165; B60L 3/10; B60L 3/106; B60L 3/108; B60W 30/02; B60W 30/18172; B60W 50/14; B60W 2520/14; B60W 2540/10; B60W 2540/12; B60W 2540/18; B60W 2552/00; B60W 2552/05;
(Continued)

(56) References Cited

U.S. PATENT DOCUMENTS

| | | | |
|---|---|---|---|
| 5,788,336 A | 8/1998 | Trovato et al. | |
| 6,844,812 B2 * | 1/2005 | Yokoyama | B60T 13/66 340/467 |

(Continued)

FOREIGN PATENT DOCUMENTS

| | | | |
|---|---|---|---|
| DE | 10015714 A1 | 10/2001 | |
| KR | 20220167841 A * | 12/2022 | G08B 3/10 |

OTHER PUBLICATIONS

Lee, KR 2022-0167841, machine translation. (Year: 2022).*

*Primary Examiner* — Mark L. Greene
(74) *Attorney, Agent, or Firm* — Vivacqua Crane, PLLC

(57) ABSTRACT

A system for providing audible notification to a user when braking sub-systems within a vehicle are actuated includes a system controller in communication with a vehicle controller, a plurality of sensors, an infotainment system within the vehicle and a plurality of braking sub-systems within the vehicle, the system controller adapted to identify at least one actuated braking sub-system from the plurality of braking sub-systems, calculate, for each of the at least one actuated braking sub-system, a delta representing a relative influence of each of the at least one actuated braking sub-system, select, based on the calculated deltas, a dominant one of the at least one actuated braking sub-system, select an audible signal associated with the dominant one of the at least one actuated braking sub-system, select a volume at which the selected audible signal is to be broadcast, and broadcast, via the vehicle infotainment system, the audible signal.

20 Claims, 3 Drawing Sheets

(51) Int. Cl.
  *B60W 30/02*          (2012.01)
  *B60W 30/18*          (2012.01)

(52) U.S. Cl.
  CPC ... *B60W 30/18172* (2013.01); *B60W 2520/14* (2013.01); *B60W 2540/10* (2013.01); *B60W 2540/12* (2013.01); *B60W 2540/18* (2013.01); *B60W 2552/40* (2020.02)

(58) Field of Classification Search
  CPC ............ B60W 2552/40; G05D 1/0061; G05D 1/0088; G05D 1/021; G05D 1/0214; G05D 1/0221; G05D 1/0223
  See application file for complete search history.

(56)              References Cited

U.S. PATENT DOCUMENTS 9,802,536 B2 *  10/2017  Pan ....................... B60W 50/14
  2023/0365105 A1    11/2023  Hertlein et al.

* cited by examiner

BRAKING SOUND AUGMENTATION

INTRODUCTION

The present disclosure relates to a system and method for providing audible notification to a user within a vehicle in response to actuation of braking sub-systems.

Vehicular decentralized brake by wire systems produce minimal audible or haptic feedback to a driver within the vehicle when braking sub-systems are active. In a centralized brake system, when the vehicle enters a slip event, valves and actuators directly linked to the brake pedal create mechanical sounds and vibrations to the driver's foot that the driver interprets as a vehicle slip condition and indication that braking sub-systems are active. Without a central hydraulic unit, the sound transferred into the vehicle cabin is reduced due to lack of valves, physical coupling to the brake pedal and structure born noise, thus, reducing the driver's ability to be aware of the road conditions in the vehicle.

Thus, while current systems and methods achieve their intended purpose, there is a need for a new and improved system and method to use inputs from braking sub-systems to play audible sounds through the vehicle's infotainment system to represent different braking events and vehicle interactions as feedback to the driver.

SUMMARY

According to several aspects of the present disclosure, a method of providing audible notification to a user within a vehicle when braking sub-systems within the vehicle are actuated, comprising, with a system controller in communication with a vehicle controller, identifying at least one actuated braking sub-system from a plurality of braking sub-systems, calculating, for each of the at least one actuated braking sub-system, a delta representing a relative influence of each of the at least one actuated braking sub-system, selecting, based on the calculated deltas, a dominant one of the at least one actuated braking sub-system, selecting an audible signal associated with the dominant one of the at least one actuated braking sub-system, selecting a volume at which the selected audible signal is to be broadcast, and broadcasting, via a vehicle infotainment system, the audible signal.

According to another aspect, the identifying at least one actuated braking sub-system from a plurality of braking sub-systems further includes determining actuation of an antilock braking sub-system.

According to another aspect, the calculating, for each of the at least one actuated braking sub-system, a delta representing a relative influence of each of the at least one actuated braking sub-system further includes collecting, via a plurality of sensors within the vehicle, a pedal position for a brake pedal within the vehicle and a surface friction for a road surface on which the vehicle is traveling, and calculating a delta for the antilock braking sub-system based on the brake pedal position and the surface friction of the road surface.

According to another aspect, the identifying at least one actuated braking sub-system from a plurality of braking sub-systems further includes determining actuation of a traction control sub-system.

According to another aspect, the calculating, for each of the at least one actuated braking sub-system, a delta representing a relative influence of each of the at least one actuated braking sub-system further includes collecting, via a plurality of sensors within the vehicle, a pedal position for an accelerator pedal within the vehicle and a surface friction for a road surface on which the vehicle is traveling, and calculating a delta for the traction control sub-system based on the accelerator pedal position and the surface friction of the road surface.

According to another aspect, the identifying at least one actuated braking sub-system from a plurality of braking sub-systems further includes determining actuation of an engine drag control sub-system.

According to another aspect, the calculating, for each of the at least one actuated braking sub-system, a delta representing a relative influence of each of the at least one actuated braking sub-system further includes receiving, from the vehicle controller, a level of a torque request for the engine drag control sub-system, collecting, via a plurality of sensors within the vehicle, a surface friction for a road surface on which the vehicle is traveling, and calculating a delta for the engine drag control sub-system based on the torque request and the surface friction of the road surface.

According to another aspect, the identifying at least one actuated braking sub-system from a plurality of braking sub-systems further includes determining actuation of an electronic stability control sub-system.

According to another aspect, the calculating, for each of the at least one actuated braking sub-system, a delta representing a relative influence of each of the at least one actuated braking sub-system further includes collecting, via a plurality of sensors within the vehicle, a surface friction for a road surface on which the vehicle is traveling, a yaw deviation of the vehicle and an angular position of a steering wheel within the vehicle, and calculating a delta for the electronic stability control sub-system based on the yaw deviation of the vehicle, the angular position of the steering wheel and the surface friction of the road surface.

According to another aspect, the selecting an audible signal associated with the dominant one of the at least one actuated braking sub-system further includes accessing a database within the system controller, wherein the database includes a plurality of audible signals stored therein, one audible signal associated with each of the plurality of braking sub-systems, and selecting the one of the plurality of audible signals that is associated with the dominant one of the at least one actuated braking sub-system.

According to another aspect, the selecting a volume at which the selected audible signal is to be broadcast further includes receiving, with the system controller, via a human machine interface (HMI) adapted to facilitate communication between a user within the vehicle and the system controller, user preferences related to a maximum volume at which audible signals are to be broadcast, and limiting the volume at which an audible signal is to be broadcast based on preferences of the user.

According to another aspect, the selecting a volume at which the selected audible signal is to be broadcast further includes measuring, based on input from a plurality of sensors within the vehicle and feedback from the vehicle controller, a level of actuation of the dominant one of the at least one actuated braking sub-system, and selecting a volume at which the selected audible signal is to be broadcast based on the measured level of actuation of the dominant one of the at least one actuated braking sub-system.

According to another aspect, the method further includes, continuously, throughout broadcasting of the audible signal, monitoring, based on input from the plurality of sensors within the vehicle and feedback from the vehicle controller, the level of actuation of the dominant one of the at least one actuated braking sub-system, and adjusting the volume at which the selected audible signal is to be broadcast as the level of actuation of the dominant one of the at least one actuated braking sub-system varies.

According to another aspect, the broadcasting, via the vehicle infotainment system, the audible signal further includes passing the audible signal through a ramp-rate filter within the system controller to gradually increase volume of the audible signal to the selected volume.

According to several aspects of the present disclosure, a system for providing audible notification to a user within a vehicle when braking sub-systems within the vehicle are actuated includes a system controller in communication with a vehicle controller, a plurality of sensors within the vehicle, an infotainment system within the vehicle and a plurality of braking sub-systems within the vehicle, the system controller adapted to identify at least one actuated braking sub-system from the plurality of braking sub-systems, calculate, for each of the at least one actuated braking sub-system, a delta representing a relative influence of each of the at least one actuated braking sub-system, select, based on the calculated deltas, a dominant one of the at least one actuated braking sub-system, select an audible signal associated with the dominant one of the at least one actuated braking sub-system, select a volume at which the selected audible signal is to be broadcast, and broadcast, via the vehicle infotainment system, the audible signal.

According to another aspect, when identifying at least one actuated braking sub-system from a plurality of braking sub-systems, the system controller is further adapted to at least one of determine actuation of an antilock braking sub-system, determine actuation of a traction control sub-system, determine actuation of an engine drag control sub-system, and determining actuation of an electronic stability control sub-system, and when calculating, for each of the at least one actuated braking sub-system, a delta representing a relative influence of each of the at least one actuated braking sub-system, the system controller is further adapted to collect, via a plurality of sensors within the vehicle, a pedal position for a brake pedal within the vehicle, a pedal position for an accelerator pedal within the vehicle, a surface friction for a road surface on which the vehicle is traveling, a yaw deviation of the vehicle and an angular position of a steering wheel within the vehicle, receive, from the vehicle controller, a level of a torque request for the engine drag control sub-system, and at least one of calculate a delta for the antilock braking sub-system based on the brake pedal position and the surface friction of the road surface, calculate a delta for the traction control sub-system based on the accelerator pedal position and the surface friction of the road surface, calculate a delta for the engine drag control sub-system based on the torque request and the surface friction of the road surface, and calculate a delta for the electronic stability control sub-system based on yaw deviation, steering wheel angle and the surface friction of the road surface.

According to another aspect, when selecting an audible signal associated with the dominant one of the at least one actuated braking sub-system, the system controller is further adapted to access a database within the system controller, wherein the database includes a plurality of audible signals stored therein, one audible signal associated with each of the plurality of braking sub-systems, and select the one of the plurality of audible signals that is associated with the dominant one of the at least one actuated braking sub-system.

According to another aspect, when selecting a volume at which the selected audible signal is to be broadcast, the system controller is further adapted to receive, with the system controller, via a human machine interface (HMI) adapted to facilitate communication between a user within the vehicle and the system controller, user preferences related to a maximum volume at which audible signals are to be broadcast, measure, based on input from the plurality of sensors within the vehicle and feedback from the vehicle controller, a level of actuation of the dominant one of the at least one actuated braking sub-system, and select a volume at which the selected audible signal is to be broadcast based on the measured level of actuation of the dominant one of the at least one actuated braking sub-system and user preferences related to a maximum volume at which audible signals are to be broadcast.

According to another aspect, the system controller is further adapted to pass the audible signal through a ramp-rate filter to gradually increase volume of the audible signal to the selected volume, and, continuously, throughout broadcasting of the audible signal, monitor, based on input from the plurality of sensors within the vehicle and feedback from the vehicle controller, the level of actuation of the dominant one of the at least one actuated braking sub-system, and adjust the volume at which the selected audible signal is to be broadcast as the level of actuation of the dominant one of the at least one actuated braking sub-system varies.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
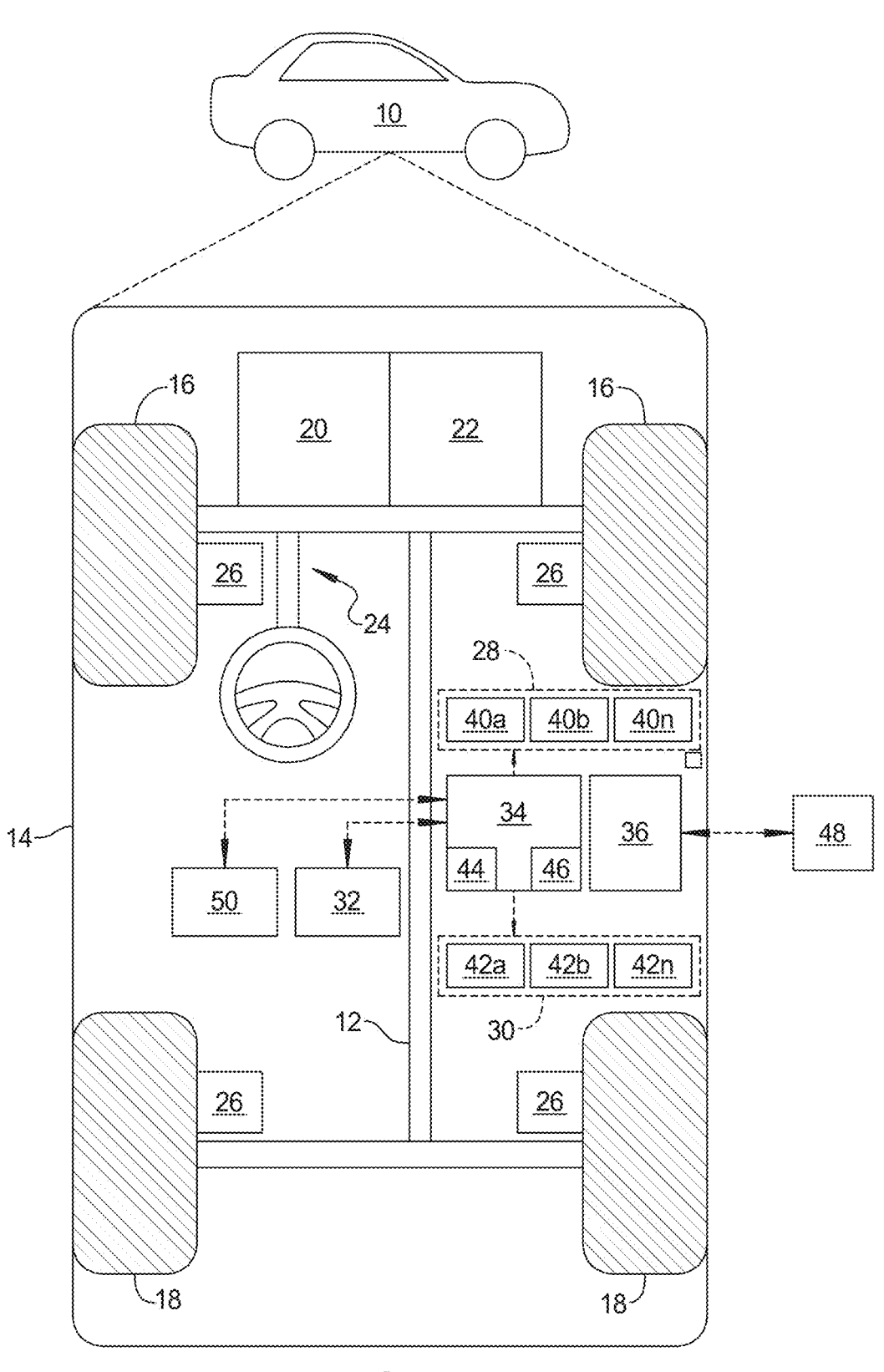
FIG. 1 is a schematic diagram of a vehicle including a system according to an exemplary embodiment of the present disclosure.

The following description is merely exemplary in nature and is not intended to limit the present disclosure, application, or uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term module refers to any hardware, software, firmware, electronic control component, processing logic, and/or processor device, individually or in any combination, including without limitation: 4 (ASIC), an electronic circuit, a processor (shared, dedicated, or group) and memory that executes one or more software or firmware programs, a combinational logic circuit, and/or other suitable components that provide the described functionality. Although the figures shown herein depict an example with certain arrangements of elements, additional intervening elements, devices, features, or components may be present in actual embodiments. It should also be understood that the figures are merely illustrative and may not be drawn to scale.

As used herein, the term "vehicle" is not limited to automobiles. While the present technology is described primarily herein in connection with automobiles, the technology is not limited to automobiles. The concepts can be used in a wide variety of applications, such as in connection with aircraft, marine craft, other vehicles, and consumer electronic components.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of" Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of" any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about", with reference to percentages, comprises a variation of plus/minus 5%, "about", with reference to temperatures, comprises a variation of plus/minus five degrees, and "about", with reference to distances, comprises plus/minus 10%. In addition, disclosure of ranges includes disclosure of all values and further divided ranges within the entire range, including endpoints and sub-ranges given for the ranges. In addition, disclosure of ranges includes disclosure of all values and further divided ranges within the entire range, including endpoints and sub-ranges given for the ranges.

Example embodiments will now be described more fully with reference to the accompanying drawings. In accordance with an exemplary embodiment, FIG. 1 shows a vehicle 10 with an associated system 50 adapted to provide audible notification to a user within the vehicle 10 when braking sub-systems within the vehicle 10 are actuated. The vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The front wheels 16 and rear wheels 18 are each rotationally coupled to the chassis 12 near a respective corner of the body 14.

In various embodiments, the vehicle 10 is an autonomous vehicle and the system 50 is incorporated into the autonomous vehicle 10. An autonomous vehicle 10 is, for example, a vehicle 10 that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), etc., can also be used. In an exemplary embodiment, the vehicle 10 is equipped with a so-called Level Four or Level Five automation system. A Level Four system indicates "high automation", referring to the driving mode-specific performance by an automated driving system of all aspects of the dynamic driving task, even if a human user does not respond appropriately to a request to intervene. A Level Five system indicates "full automation", referring to the full-time performance by an automated driving system of all aspects of the dynamic driving task under all roadway and environmental conditions that can be managed by a human driver.

As shown, the vehicle 10 generally includes a propulsion system 20, a transmission system 22, a steering system 24, a brake system 26, a sensor system 28, an actuator system 30, at least one data storage device 32, a vehicle controller 34, and a wireless communication module 36. In an embodiment in which the vehicle 10 is an electric vehicle, there may be no transmission system 22. The propulsion system 20 may, in various embodiments, include an internal combustion engine, an electric machine such as a traction motor, and/or a fuel cell propulsion system. The transmission system 22 is configured to transmit power from the propulsion system 20 to the vehicle's front wheels 16 and rear wheels 18 according to selectable speed ratios. According to various embodiments, the transmission system 22 may include a step-ratio automatic transmission, a continuously-variable transmission, or other appropriate transmission. The brake system 26 is configured to provide braking torque to the vehicle's front wheels 16 and rear wheels 18. The brake system 26 may, in various embodiments, include friction brakes, brake by wire, a regenerative braking system such as an electric machine, and/or other appropriate braking systems. The steering system 24 influences a position of the front wheels 16 and rear wheels 18. While depicted as including a steering wheel for illustrative purposes, in some embodiments contemplated within the scope of the present disclosure, such as for a fully autonomous vehicle, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras, thermal cameras, ultrasonic sensors, and/or other sensors. The cameras can include two or more digital cameras spaced at a selected distance from each other, in which the two or more digital cameras are used to obtain stereoscopic images of the surrounding environment in order to obtain a three-dimensional image or map. The plurality of sensing devices 40a-40n is used to determine information about an environment surrounding the vehicle 10. In an exemplary embodiment, the plurality of sensing devices 40a-40n includes at least one of a motor speed sensor, a motor torque sensor, an electric drive motor voltage and/or current sensor, an accelerator pedal position sensor, a coolant temperature sensor, a cooling fan speed sensor, and a transmission oil temperature sensor. In another exemplary embodiment, the plurality of sensing devices 40a-40n further includes sensors to determine information about the environment surrounding the vehicle 10, for example, an ambient air temperature sensor, a barometric pressure sensor, and/or a photo and/or video camera which is positioned to view the environment in front of the vehicle 10. In another exemplary embodiment, at least one of the plurality of sensing devices 40a-40n is capable of measuring distances in the environment surrounding the vehicle 10.

The vehicle controller 34 includes at least one processor 44 and a computer readable storage device or media 46. The at least one data processor 44 can be any custom made or commercially available processor, a central processing unit (CPU), a graphics processing unit (GPU), an auxiliary processor among several processors associated with the vehicle controller 34, a semi-conductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the at least one data processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which includes an ordered listing of executable instructions for implementing logical functions. The instructions, when executed by the at least one processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one controller 34 is shown in FIG. 1, embodiments of the vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

In various embodiments, one or more instructions of the vehicle controller 34 are embodied in a trajectory planning system and, when executed by the at least one data processor 44, generates a trajectory output that addresses kinematic and dynamic constraints of the environment. For example, the instructions receive as input process sensor and map data. The instructions perform a graph-based approach with a customized cost function to handle different road scenarios in both urban and highway roads.

The wireless communication module 36 is configured to wirelessly communicate information to and from other remote entities 48, such as but not limited to, other vehicles ("V2V" communication,) infrastructure ("V2I" communication), remote systems, remote servers, cloud computers, and/or personal devices. In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The vehicle controller 34 is a non-generalized, electronic control device having a preprogrammed digital computer or processor, memory or non-transitory computer readable medium used to store data such as control logic, software applications, instructions, computer code, data, lookup tables, etc., and a transceiver [or input/output ports]. Computer readable medium includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device. Computer code includes any type of program code, including source code, object code, and executable code.

Figure 2:
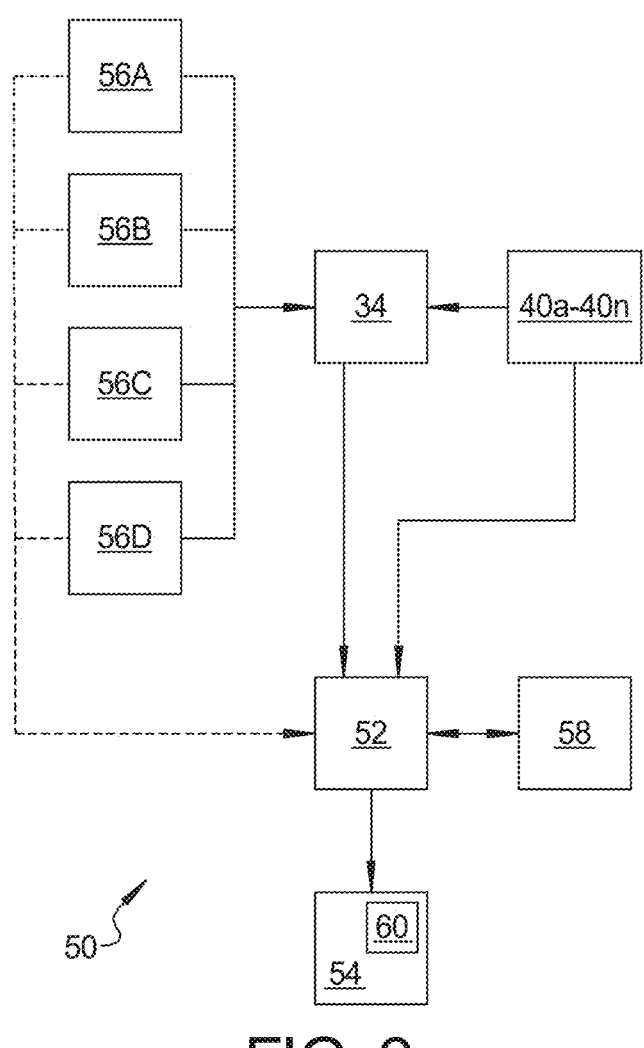
FIG. 2 is a schematic diagram of the system.

Referring to FIG. 2, the system 50 includes a system controller 52 in communication with the vehicle controller 34, the plurality of sensors 40a-40n, a vehicle infotainment system 54, and a plurality of braking sub-systems 56A, 56B, 56C, 56D within the vehicle 10. Braking sub-systems 56A, 56B, 56C, 56D are adapted to assist vehicle control when the vehicle 10 experiences a slip-event, such as when the vehicle 10 is driving on slippery roads, stopping abruptly, or unstable. In an exemplary embodiment, the plurality of braking sub-systems 56A, 56B, 56C, 56D includes an anti-lock braking system 56A, a traction control system 56B, an engine drag control system 56C and an electronic stability control system 56D. It should be understood that the plurality of braking sub-systems 56A, 56B, 56C, 56D may include other systems not mentioned here that are adapted to provide control assistance during a slip event. The system controller 52 may communicate with the braking sub-systems 56A, 56B, 56C, 56D either indirectly, through the vehicle controller 34, or directly with each of the braking sub-systems 56A, 56B, 56C, 56D.

The system 50 also includes a human-machine interface (HMI) 58 in communication with the system controller 52 and adapted to facilitate communication between the system 50 and a user within the vehicle 10. The HMI 58 may include a touch screen which allows the user to input information to the system controller 52 via the HMI 58. In other embodiments, the HMI 58 could also be associated with a speaker and/or cameras which allow a user within the vehicle 10 to provide input to the system controller 52 verbally or with gestures.

In an exemplary embodiment, the system controller 52 is adapted to identify at least one actuated braking sub-system 56A, 56B, 56C, 56D from the plurality of braking sub-systems 56A, 56B, 56C, 56D. The system controller 52 receives feedback, either from the vehicle controller 34 or directly from each of the plurality of braking sub-systems 56A, 56B, 56C, 56D when any one of the braking sub-systems 56A, 56B, 56C, 56D is actuated. For example, if the vehicle 10 is attempting a hard stop, the vehicle controller 34 will actuate the anti-lock braking system 56A to prevent the wheels of the vehicle 10 from locking up. Thus, the system controller 52 will receive indication that the anti-lock braking system 56A is active, wherein the anti-lock braking system 56A is classified as an actuated braking sub-system. Depending on the specific circumstances and environmental factors, any one or combination of more than one of the braking sub-systems 56A, 56B, 56C, 56D may be actuated.

For each of the at least one actuated braking sub-system 56A, 56B, 56C, 56D, the system controller 52 calculates a delta representing a relative influence of each of the at least one actuated braking sub-system 56A, 56B, 56C, 56D. The calculated delta for each of the at least one actuated braking sub-system 56A, 56B, 56C, 56D provides a metric to allow the system controller 52 to determine which of the at least one actuated braking sub-system 56A, 56B, 56C, 56D is pre-dominant. For example, in a traditional centralized braking system if both an anti-lock braking system and an electronic stability control system were actuated, the movement of actuators, valves and fluids within the respective systems would make audible noise that is perceptible to a user/driver within the vehicle 10. However, depending on the intensity at which each of the actuated braking sub-systems is actuated, the user/driver may hear one over the other. Thus, the system controller 52 of the present disclosure uses the calculated delta for each of the at least one actuated braking sub-system 56A, 56B, 56C, 56D to determine which of the at least one actuated braking sub-system 56A, 56B, 56C, 56D should be pre-dominantly perceived by the user/driver of the vehicle 10.

In an exemplary embodiment, the system controller 52 collects, via the plurality of sensors 40a-40n within the vehicle 10, a pedal position for a brake pedal within the vehicle 10, a pedal position for an accelerator pedal within the vehicle 10, a surface friction for a road surface on which the vehicle 10 is traveling, a yaw deviation of the vehicle 10 and an angular position of a steering wheel within the vehicle 10. Further, the system controller 52 receives, from the vehicle controller 34, a level of a torque request for the engine drag control system 56C. The system controller uses data from the plurality of sensors 40a-40n related to operating conditions of the vehicle 10 and environmental conditions to calculate a delta for each of the at least one of the plurality of braking sub-systems 56A, 56B, 56C, 56D.

In an exemplary embodiment, the system controller 52 calculates a delta for the antilock braking sub-system 56A based on the brake pedal position and the surface friction of the road surface. Wherein, the more the brake pedal is pushed inward, the harder the brakes are being applied, and the higher the delta for the anti-lock braking system 56A, and the lower the surface friction (mu) of the road surface, the more severe the vehicle 10 will slip, requiring more intervention by the anti-lock braking system 56A, and the higher the delta for the anti-lock braking system 56A. The two inputs are converted to a percentage and combined for a composite delta for the anti-lock braking system 56A. The system controller 52, may, either based on pre-set directive or based on preferences entered by a user/driver of the vehicle 10, place a weighted multiplier on one of the two inputs (brake pedal position, road surface friction) over the other.

Similarly, the system controller 52 calculates a delta for the traction control system 56B based on the accelerator pedal position and the surface friction of the road surface. Wherein, the more the accelerator pedal is pushed inward, the more the vehicle 10 is accelerating, and the higher the delta for the traction control system 56B, and the lower the surface friction (mu) of the road surface, the more severe the vehicle 10 will slip, requiring more intervention by the traction control system 56B, and the higher the delta for the traction control system 56B. The two inputs are converted to a percentage and combined for a composite delta for the traction control system 56B. The system controller 52, may, either based on pre-set directive or based on preferences entered by a user/driver of the vehicle 10, place a weighted multiplier on one of the two inputs (brake pedal position, road surface friction) over the other.

Further, the system controller 52 calculates a delta for the engine drag control system 56C based on a level of the torque request by the vehicle controller 34 and the surface friction of the road surface. Wherein, the higher the torque request, the higher the delta for the engine drag control system 56C, and the lower the surface friction (mu) of the road surface, the more severe the vehicle 10 will slip, requiring more intervention by the engine drag control system 56C, and the higher the delta for the engine drag control system 56C. The two inputs are converted to a percentage and combined for a composite delta for the engine drag control system 56C. The system controller 52, may, either based on pre-set directive or based on preferences entered by a user/driver of the vehicle 10, place a weighted multiplier on one of the two inputs (torque request, road surface friction) over the other.

Finally, the system controller 52 calculates a delta for the electronic stability control system 56D based on the yaw deviation of the vehicle, angular position of the steering wheel of the vehicle 10 and the surface friction of the road surface. Wherein, the higher the yaw deviation of the vehicle, the more the vehicle 10 is sliding and the higher the delta for the electronic stability control system 56D, and, the higher the angular position of the steering wheel (more steering input), the higher the delta for the electronic stability control system 56D, and the lower the surface friction (mu) of the road surface, the more severe the vehicle 10 will slip, requiring more intervention by the electronic stability control system 56D, and the higher the delta for the electronic stability control system 56D. The three inputs are converted to a percentage and combined for a composite delta for the electronic stability control system 56D. The system controller 52, may, either based on pre-set directive or based on preferences entered by a user/driver of the vehicle 10, place a weighted multiplier on one of the inputs over the other two.

The system controller 52, using the calculated deltas, selects a dominant one of the at least one actuated braking sub-system 56A, 56B, 56C, 56D. For example, if the anti-lock braking system 56A has the highest calculated delta, then the system controller 52 selects the anti-lock braking system 56A as the dominant one of the at least one actuated braking sub-systems 56A, 56B, 56C, 56D. The system controller 52 selects a dominant one of the at least one actuated braking system 56A, 56B, 56C, 56D because in a given situation, more than one of the braking sub-systems 56A, 56B, 56C, 56D may be actuated, but, the system controller 52 picks the most significant or dominant one of the at least one actuated braking sub-system 56A, 56B, 56C, 56D. Broadcasting more than one unique audible signal simultaneously could be confusing and would be less helpful.

The system controller 52 then selects an audible signal associated with the dominant one of the at least one actuated braking sub-system 56A, 56B, 56C, 56D (in the example above, the anti-lock braking system 56A), selects a volume at which the selected audible signal is to be broadcast, and broadcasts, via a speaker 60 of the vehicle infotainment system 54, the audible signal.

In an exemplary embodiment, when selecting an audible signal associated with the dominant one of the at least one actuated braking sub-system 56A, 56B, 56C, 56D, the system controller 52 is further adapted to access a database 62 within the system controller 52. The database 62 includes a plurality of audible signals stored therein, one audible signal associated with each of the plurality of braking sub-systems 56A, 56B, 56C, 56D. The system controller 52 selects the one of the plurality of audible signals stored within the database 62 that is associated with the dominant one of the at least one actuated braking sub-system 56A, 56B, 56C, 56D. In the example cited above, wherein the dominant one of the at least one actuated braking sub-system 56A, 56B, 56C, 56D is the anti-lock braking system 56A, the system controller 52 selects the audible signal that is associated with the anti-lock braking system 56A for broadcast.

The HMI 58 allows a user/driver to enter preferences to the system controller 52. The audible signal associated with each of the plurality of braking sub-systems 56A, 56B, 560, 56D may be based on user/driver preferences, wherein the user/driver picks a specific audible signal that they want to be associated with a specific one of the plurality of braking sub-systems 56A, 56B, 56C, 56D.

In another exemplary embodiment, when selecting a volume at which the selected audible signal is to be broadcast, the system controller 52 is further adapted to measure, based on input from the plurality of sensors 40a-40n within the vehicle 10 and feedback from the vehicle controller 34, a level of actuation of the dominant one of the at least one actuated braking sub-system 56A, 56B, 56C, 56D, and select a volume at which the selected audible signal is to be broadcast based on the measured level of actuation of the dominant one of the at least one actuated braking sub-system 56A, 56B, 56C, 56D. For example, when the dominant one of the at least one actuated braking sub-system 56A, 56B, 56C, 56D is the anti-lock braking sub-system 56A, the system controller 52 selects a volume based on how hard the brakes are being applied. Thus, based on measurements, such as the brake pedal position, the system controller 52 will provide a louder audible signal when the brakes are being applied very hard and a less loud audible signal when the brakes are being applied less harshly. In this way, the system 50 provides an audible signal to the user/driver that not only indicates that a particular one of the plurality of braking sub-systems 56A, 56B, 56C, 56D is being actuated, but also, based on the volume of the audible signal, provides an indicated of the severity of the slip event that triggered actuation of the particular one of the plurality of braking sub-systems 56A, 56B, 56C, 56D.

In another exemplary embodiment, throughout broadcasting of the audible signal, the system controller 52 is further adapted to continuously monitor, based on input from the plurality of sensors 40a-40n within the vehicle 10 and feedback from the vehicle controller 34, the level of actuation of the dominant one of the at least one actuated braking sub-system 56A, 56B, 56C, 56D, and adjust the volume at which the selected audible signal is to be broadcast as the level of actuation of the dominant one of the at least one actuated braking sub-system 56A, 56B, 56C, 56D varies. Thus, if the slip event continues or becomes more severe, and a dominant one of the at least one actuated braking sub-system 56A, 56B, 56C, 56D is actuated more aggressively, the volume of the broadcasted audible signal is increased. For example, if the system controller 52 is broadcasting an audible signal at a selected volume to indicated to the user/driver actuation of the anti-lock braking system 56A, and continued erratic behavior (slipping, spinning out) of the vehicle causes the user/driver to push harder on the brakes, the system controller 52 will increase the volume of the audible signal accordingly. Likewise, if the system controller detects the slip event is lessening and the user/driver is using less force on the brake pedal, the system controller 52 will lower the volume of the audible signal.

The HMI 58 allows a user/driver to enter preferences to the system controller 52. Thus a user/drive can enter preferences related to a maximum volume that an audible signal may be broadcast. Further, the user/driver may enter preferences providing that each of the audible signals have a different maximum level. For example, the user/driver may set the maximum volume for actuation of the engine drag control system 56C lower than the maximum volume for actuation of the anti-lock braking system 56A, because the user/driver is more concerned about actuation of the anti-lock braking system 56A over the engine drag control system 56C.

In another exemplary embodiment, the system controller 52 is adapted to pass the audible signal through a ramp-rate filter to gradually increase volume of the audible signal to the selected volume. In this way, the system controller 52 avoid blasting the user/driver with a loud audible signal that could potentially startle or scare the user/driver. The audible signal starts out at a low volume and gradually gets louder up to the selected volume.

Figure 3:
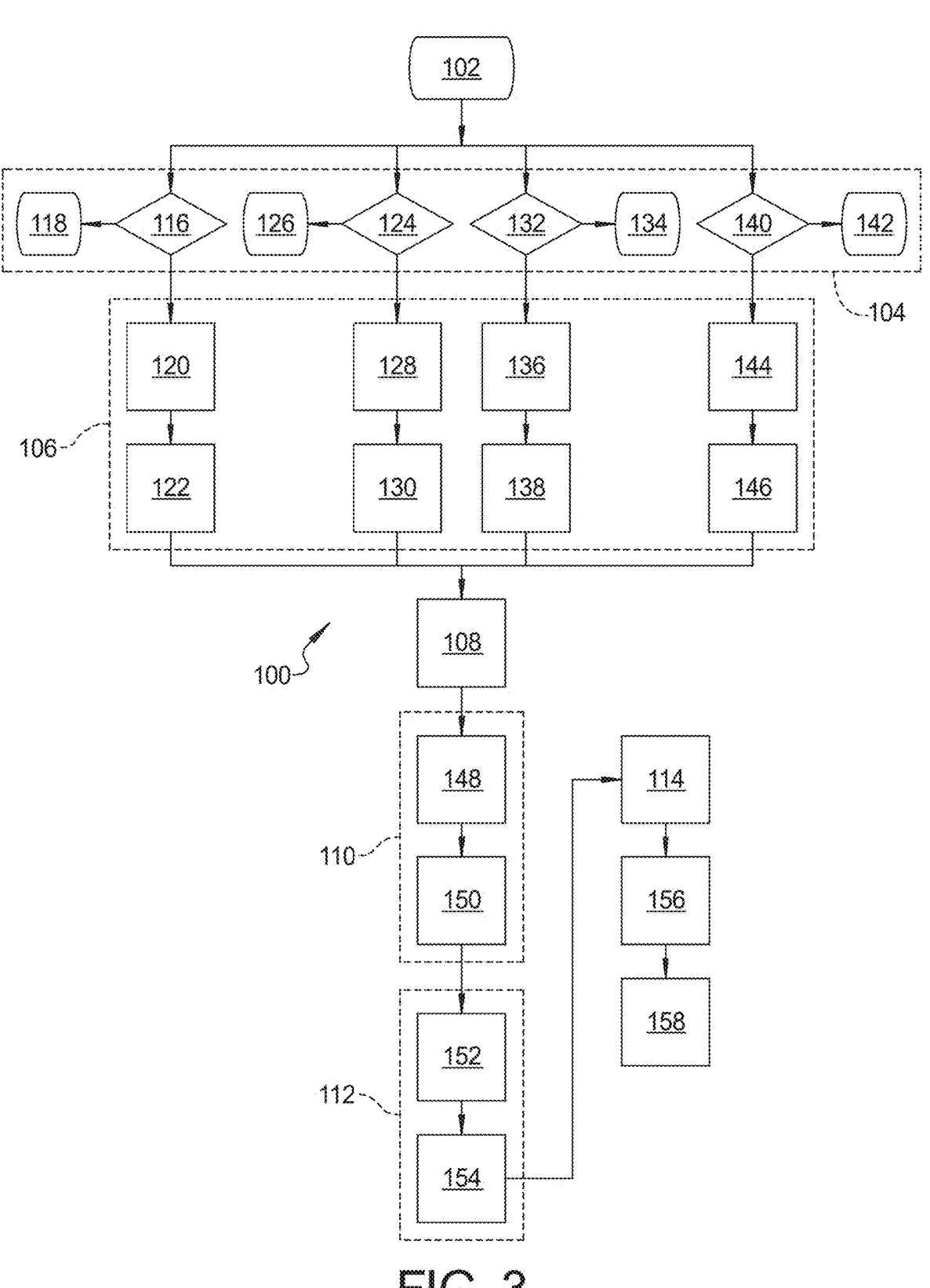
FIG. 3 is a flow chart illustrating a method of operating the system of FIG. 1.

Referring to FIG. 3, a method 100 of providing audible notification to a user within a vehicle 10 when braking sub-systems 56A, 56B, 56C, 56D within the vehicle 10 are actuated, includes, with a system controller 52 in communication with a vehicle controller 34, beginning at block 102 and moving to block 104, identifying at least one actuated braking sub-system 56A, 56B, 56C, 56D from a plurality of braking sub-systems 56A, 56B, 56C, 56D, moving to block 106, calculating, for each of the at least one actuated braking sub-system 56A, 56B, 56C, 56D, a delta representing a relative influence of each of the at least one actuated braking sub-system 56A, 56B, 56C, 56D, moving to block 108, selecting, based on the calculated deltas, a dominant one of the at least one actuated braking sub-system 56A, 56B, 56C, 56D, moving to block 110, selecting an audible signal associated with the dominant one of the at least one actuated braking sub-system 56A, 56B, 56C, 56D, moving to block 112, selecting a volume at which the selected audible signal is to be broadcast, and, moving to block 114, broadcasting, via a vehicle infotainment system 54, the audible signal.

In an exemplary embodiment, the identifying at least one actuated braking sub-system 56A, 56B, 56C, 56D from a plurality of braking sub-systems 56A, 56B, 56C, 56D further includes, moving to block 116, determining actuation of an antilock braking sub-system 56A. If, at block 116, the anti-lock braking sub-system 56A has not been actuated, then, moving to block 118, no action is taken. If, at block 116, the anti-lock braking system 56A has been actuated, then, the calculating, for each of the at least one actuated braking sub-system 56A, 56B, 56C, 56D, a delta representing a relative influence of each of the at least one actuated braking sub-system 56A, 56B, 56D at block 106 further includes, moving to block 120, collecting, via a plurality of sensors 40a-40n within the vehicle 10, a pedal position for a brake pedal within the vehicle 10 and a surface friction for a road surface on which the vehicle 10 is traveling, and, moving to block 122, calculating a delta for the antilock braking sub-system 56A based on the brake pedal position and the surface friction of the road surface.

In another exemplary embodiment, the identifying at least one actuated braking sub-system 56A, 56B, 56C, 56D from a plurality of braking sub-systems 56A, 56B, 56C, 56D at block 104 further includes, moving to block 124, determining actuation of a traction control sub-system 56B. If, at block 124 the traction control sub-system 56B has not been actuated, then, moving to block 126, no action is taken. If, at block 124, the traction control sub-system 56B is actuated, then, the calculating, for each of the at least one actuated braking sub-system 56A, 56B, 56C, 56D, a delta representing a relative influence of each of the at least one actuated braking sub-system 56A, 56B, 56C, 56D at block 106 further includes, moving to block 128, collecting, via a plurality of sensors 40a-40n within the vehicle 10, a pedal position for a brake pedal within the vehicle 10 and a surface friction for a road surface on which the vehicle 10 is traveling, and, moving to block 130, calculating a delta for the traction control sub-system 56B based on the brake pedal position and the surface friction of the road surface.

In another exemplary embodiment, the identifying at least one actuated braking sub-system 56A, 56B, 56C, 56D from a plurality of braking sub-systems 56A, 56B, 56C, 56D at block 104 further includes, moving to block 132, determining actuation of an engine drag control sub-system 56C. If, at block 132, the engine drag control sub-system 56C has not been actuated, then, moving to block 134, no action is taken. If, at block 132, the engine drag control sub-system 56C has been actuated, then, the calculating, for each of the at least one actuated braking sub-system 56A, 56B, 56C, 56D, a delta representing a relative influence of each of the at least one actuated braking sub-system 56A, 56B, 56C, 56D at block 106 further includes, moving to block 136, receiving, from the vehicle controller 34, a level of a torque request for the engine drag control sub-system 56C and collecting, via a plurality of sensors 40a-40n within the vehicle 10, a surface friction for a road surface on which the vehicle 10 is traveling, and, moving to block 138, calculating a delta for the engine drag control sub-system 56C based on the torque request and the surface friction of the road surface.

In yet another exemplary embodiment, the identifying at least one actuated braking sub-system 56A, 56B, 56C, 56D from a plurality of braking sub-systems 56A, 56B, 56C, 56D at block 104 further includes, moving to block 140, determining actuation of an electronic stability sub-system 56D. If, at block 140, the electronic stability sub-system 56D is not actuated, then, moving to block 142, no action is taken. If, at block 140, the electronic stability sub-system 56D is actuated, then the calculating, for each of the at least one actuated braking sub-system 56A, 56B, 56C, 56D, a delta representing a relative influence of each of the at least one actuated braking sub-system 56A, 56B, 560, 56D at block 106 further includes, moving to block 144, collecting, via a plurality of sensors 40a-40n within the vehicle 10, a surface friction for a road surface on which the vehicle 10 is traveling, a yaw deviation of the vehicle 10 and an angular position of a steering wheel within the vehicle 10, and, moving to block 146, calculating a delta for the electronic stability control sub-system 56D based on the torque request and the surface friction of the road surface.

In another exemplary embodiment, the selecting an audible signal associated with the dominant one of the at least one actuated braking sub-system 56A, 56B, 56C, 56D at block 110 further includes, moving to block 148, accessing a database 62 within the system controller 52, wherein the database 62 includes a plurality of audible signals stored therein, one audible signal associated with each of the plurality of braking sub-systems 56A, 56B, 56C, 56D, and, moving to block 150, selecting the one of the plurality of audible signals that is associated with the dominant one of the at least one actuated braking sub-system 56A, 56B, 56C, 56D.

In another exemplary embodiment, the selecting a volume at which the selected audible signal is to be broadcast at block 112 further includes, moving to block 152, measuring, based on input from a plurality of sensors 40a-40n within the vehicle 10 and feedback from the vehicle controller 34, a level of actuation of the dominant one of the at least one actuated braking sub-system 56A, 56B, 56C, 56D, and, moving to block 154, selecting a volume at which the selected audible signal is to be broadcast based on the measured level of actuation of the dominant one of the at least one actuated braking sub-system 56A, 56B, 56C, 56D.

In an exemplary embodiment, the method 100 further includes, moving from block 114 to block 156, continuously, throughout broadcasting of the audible signal, monitoring, based on input from the plurality of sensors 40a-40n within the vehicle 10 and feedback from the vehicle controller 34, the level of actuation of the dominant one of the at least one actuated braking sub-system 56A, 56B, 56C, 56D, and, moving to block 158, adjusting the volume at which the selected audible signal is to be broadcast as the level of actuation of the dominant one of the at least one actuated braking sub-system 56A, 56B, 56C, 56D varies.

In still another exemplary embodiment, the broadcasting, via the vehicle infotainment system 54, the audible signal at block 114 further includes passing the audible signal through a ramp-rate filter within the system controller 52 to gradually increase volume of the audible signal to the selected volume.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method of providing audible notification to a user within a vehicle when braking sub-systems within the vehicle are actuated, comprising, when performed by a system controller in communication with a vehicle controller:

identifying at least one actuated braking sub-system from a plurality of braking sub-systems;

calculating, for each of the at least one actuated braking sub-system, a delta representing a relative influence of each of the at least one actuated braking sub-system;

selecting, based on the calculated deltas, a dominant one of the at least one actuated braking sub-system;

selecting an audible signal associated with the dominant one of the at least one actuated braking sub-system;

selecting a volume at which the selected audible signal is to be broadcast; and broadcasting, via a vehicle infotainment system, the audible signal.

2. The method of claim 1, wherein the identifying at least one actuated braking sub-system from a plurality of braking sub-systems further includes determining actuation of an antilock braking sub-system.

3. The method of claim 2, wherein the calculating, for each of the at least one actuated braking sub-system, a delta representing a relative influence of each of the at least one actuated braking sub-system further includes:

collecting, via a plurality of sensors within the vehicle, a pedal position for a brake pedal within the vehicle and a surface friction for a road surface on which the vehicle is traveling; and calculating a delta for the antilock braking sub-system based on the brake pedal position and the surface friction of the road surface.

4. The method of claim 1, wherein the identifying at least one actuated braking sub-system from a plurality of braking sub-systems further includes determining actuation of a traction control sub-system.

5. The method of claim 4, wherein the calculating, for each of the at least one actuated braking sub-system, a delta representing a relative influence of each of the at least one actuated braking sub-system further includes:

collecting, via a plurality of sensors within the vehicle, a pedal position for an accelerator pedal within the vehicle and a surface friction for a road surface on which the vehicle is traveling; and calculating a delta for the traction control sub-system based on the accelerator pedal position and the surface friction of the road surface.

6. The method of claim 1, wherein the identifying at least one actuated braking sub-system from a plurality of braking sub-systems further includes determining actuation of an engine drag control sub-system.

7. The method of claim 6, wherein the calculating, for each of the at least one actuated braking sub-system, a delta representing a relative influence of each of the at least one actuated braking sub-system further includes:

receiving, from the vehicle controller, a level of a torque request for the engine drag control sub-system;

collecting, via a plurality of sensors within the vehicle, a surface friction for a road surface on which the vehicle is traveling; and calculating a delta for the engine drag control sub-system based on the torque request and the surface friction of the road surface.

8. The method of claim 1, wherein the identifying at least one actuated braking sub-system from a plurality of braking sub-systems further includes determining actuation of an electronic stability control sub-system.

9. The method of claim 8, wherein the calculating, for each of the at least one actuated braking sub-system, a delta representing a relative influence of each of the at least one actuated braking sub-system further includes:

collecting, via a plurality of sensors within the vehicle, a surface friction for a road surface on which the vehicle is traveling, a yaw deviation of the vehicle and an angular position of a steering wheel within the vehicle; and calculating a delta for the electronic stability control sub-system based on the yaw deviation of the vehicle, the angular position of the steering wheel and the surface friction of the road surface.

10. The method of claim 1 wherein the selecting an audible signal associated with the dominant one of the at least one actuated braking sub-system further includes:

accessing a database within the system controller, wherein the database includes a plurality of audible signals stored therein, one audible signal associated with each of the plurality of braking sub-systems; and selecting the one of the plurality of audible signals that is associated with the dominant one of the at least one actuated braking sub-system.

11. The method of claim 1, wherein the selecting a volume at which the selected audible signal is to be broadcast further includes:

receiving, with the system controller, via a human machine interface (HMI) adapted to facilitate communication between a user within the vehicle and the system controller, user preferences related to a maximum volume at which audible signals are to be broadcast; and limiting the volume at which an audible signal is to be broadcast based on preferences of the user.

12. The method of claim 1, wherein the selecting a volume at which the selected audible signal is to be broadcast further includes:

measuring, based on input from a plurality of sensors within the vehicle and feedback from the vehicle controller, a level of actuation of the dominant one of the at least one actuated braking sub-system; and selecting a volume at which the selected audible signal is to be broadcast based on the measured level of actuation of the dominant one of the at least one actuated braking sub-system.

13. The method of claim 12, further including, continuously, throughout broadcasting of the audible signal:

monitoring, based on input from the plurality of sensors within the vehicle and feedback from the vehicle controller, the level of actuation of the dominant one of the at least one actuated braking sub-system; and adjusting the volume at which the selected audible signal is to be broadcast as the level of actuation of the dominant one of the at least one actuated braking sub-system varies.

14. The method of claim 1, wherein the broadcasting, via the vehicle infotainment system, the audible signal further includes passing the audible signal through a ramp-rate filter within the system controller to gradually increase volume of the audible signal to the selected volume.

15. A system for providing audible notification to a user within a vehicle when braking sub-systems within the vehicle are actuated, comprising:

a system controller in communication with a vehicle controller, a plurality of sensors within the vehicle, an infotainment system within the vehicle and a plurality of braking sub-systems within the vehicle, the system controller adapted to:

identify at least one actuated braking sub-system from the plurality of braking sub-systems;

calculate, for each of the at least one actuated braking sub-system, a delta representing a relative influence of each of the at least one actuated braking sub-system;

select, based on the calculated deltas, a dominant one of the at least one actuated braking sub-system;

select an audible signal associated with the dominant one of the at least one actuated braking sub-system;

select a volume at which the selected audible signal is to be broadcast; and broadcast, via the vehicle infotainment system, the audible signal.

16. The system of claim 15, wherein:

when identifying at least one actuated braking sub-system from a plurality of braking sub-systems, the system controller is further adapted to at least one of:

determine actuation of an antilock braking sub-system;

determine actuation of a traction control sub-system;

determine actuation of an engine drag control sub-system; and determining actuation of an electronic stability control sub-system; and when calculating, for each of the at least one actuated braking sub-system, a delta representing a relative influence of each of the at least one actuated braking sub-system, the system controller is further adapted to:

collect, via a plurality of sensors within the vehicle, a pedal position for a brake pedal within the vehicle, a pedal position for an accelerator pedal within the vehicle, a surface friction for a road surface on which the vehicle is traveling, a yaw deviation of the vehicle and an angular position of a steering wheel within the vehicle;

receive, from the vehicle controller, a level of a torque request for the engine drag control sub-system; and at least one of:

calculate a delta for the antilock braking sub-system based on the brake pedal position and the surface friction of the road surface;

calculate a delta for the traction control sub-system based on the accelerator pedal position and the surface friction of the road surface;

calculate a delta for the engine drag control sub-system based on the torque request and the surface friction of the road surface; and calculate a delta for the electronic stability control sub-system based on yaw deviation, steering wheel angle and the surface friction of the road surface.

17. The system of claim 15 wherein when selecting an audible signal associated with the dominant one of the at least one actuated braking sub-system, the system controller is further adapted to:

access a database within the system controller, wherein the database includes a plurality of audible signals stored therein, one audible signal associated with each of the plurality of braking sub-systems; and select the one of the plurality of audible signals that is associated with the dominant one of the at least one actuated braking sub-system.

18. The system of claim 17 wherein when selecting a volume at which the selected audible signal is to be broadcast, the system controller is further adapted to:

receive, with the system controller, via a human machine interface (HMI) adapted to facilitate communication between a user within the vehicle and the system controller, user preferences related to a maximum volume at which audible signals are to be broadcast;

measure, based on input from the plurality of sensors within the vehicle and feedback from the vehicle controller, a level of actuation of the dominant one of the at least one actuated braking sub-system; and select a volume at which the selected audible signal is to be broadcast based on the measured level of actuation of the dominant one of the at least one actuated braking sub-system and user preferences related to a maximum volume at which audible signals are to be broadcast.

19. The system of claim 18 wherein the system controller is further adapted to:

pass the audible signal through a ramp-rate filter to gradually increase volume of the audible signal to the selected volume; and continuously, throughout broadcasting of the audible signal:

monitor, based on input from the plurality of sensors within the vehicle and feedback from the vehicle controller, the level of actuation of the dominant one of the at least one actuated braking sub-system; and adjust the volume at which the selected audible signal is to be broadcast as the level of actuation of the dominant one of the at least one actuated braking sub-system varies.

20. A vehicle having a system for providing audible notification to a user within the vehicle when braking sub-systems within the vehicle are actuated, the system comprising:

a system controller in communication with a vehicle controller, a plurality of sensors within the vehicle, an infotainment system within the vehicle and a plurality of braking sub-systems within the vehicle, the system controller adapted to:

identify at least one actuated braking sub-system from the plurality of braking sub-systems by at least one of:

determine actuation of an antilock braking sub-system;

determine actuation of a traction control sub-system;

determine actuation of an engine drag control sub-system; and determining actuation of an electronic stability control sub-system;

collect, via a plurality of sensors within the vehicle, a pedal position for a brake pedal within the vehicle, a pedal position for an accelerator pedal within the vehicle, a surface friction for a road surface on which the vehicle is traveling, a yaw deviation of the vehicle and an angular position of a steering wheel within the vehicle;

receive, from the vehicle controller, a level of a torque request for the engine drag control sub-system;

calculate, for each of the at least one actuated braking sub-system, a delta representing a relative influence of each of the at least one actuated braking sub-system by at least one of:

calculate a delta for the antilock braking sub-system based on the brake pedal position and the surface friction of the road surface;

calculate a delta for the traction control sub-system based on the accelerator pedal position and the surface friction of the road surface;

calculate a delta for the engine drag control sub-system based on the torque request and the surface friction of the road surface; and calculate a delta for the electronic stability control sub-system based on yaw deviation, steering wheel angle and the surface friction of the road surface;

select, based on the calculated deltas, a dominant one of the at least one actuated braking sub-system;

access a database within the system controller, wherein the database includes a plurality of audible signals stored therein, one audible signal associated with each of the plurality of braking sub-systems;

select the one of the plurality of audible signals that is associated with the dominant one of the at least one actuated braking sub-system;

measure, based on input from the plurality of sensors within the vehicle and feedback from the vehicle controller, a level of actuation of the dominant one of the at least one actuated braking sub-system;

select a volume at which the selected audible signal is to be broadcast based on the measured level of actuation of the dominant one of the at least one actuated braking sub-system;

broadcast, via the vehicle infotainment system, the audible signal; and continuously, throughout broadcasting of the audible signal:

monitor, based on input from the plurality of sensors within the vehicle and feedback from the vehicle controller, the level of actuation of the dominant one of the at least one actuated braking sub-system; and adjust the volume at which the selected audible signal is to be broadcast as the level of actuation of the dominant one of the at least one actuated braking sub-system varies.

* * * * *